United States Patent [19]

Caudle et al.

[11] Patent Number: 4,970,383
[45] Date of Patent: Nov. 13, 1990

[54] LASER OUTPUT POWER MEASURING METHOD AND APPARATUS

[75] Inventors: George F. Caudle, Chelmsford; Gary K. Klauminzer, Lexington, both of Mass.

[73] Assignee: Questek, Inc., Billerica, Mass.

[21] Appl. No.: 321,512

[22] Filed: Mar. 9, 1989

[51] Int. Cl.$^5$ .................................................. H01J 3/14
[52] U.S. Cl. ...................................... 250/216; 372/99
[58] Field of Search .......................... 372/31, 99, 100; 219/121.61, 121.62; 250/216, 214 R, 239, 205; 356/225

[56] References Cited

U.S. PATENT DOCUMENTS 4,715,689 12/1987 O'Meara et al. ....................... 372/99
4,812,641 3/1989 Ortiz ..................................... 250/205

Primary Examiner—David C. Nelms
Attorney, Agent, or Firm—Nutter, McClennen & Fish

[57] ABSTRACT

A laser unit, including an optical power measuring device, measures, as the beam sample, a portion of the laser beam that is reflected out of the laser beam path by a wedge shaped front mirror, that is, an optical wedge. The front mirror has two surfaces, a partially reflective surface which reflects a portion of the beam back into the laser cavity and a nominally non-reflecting surface which permits a portion of the beam to exit the laser. The non-reflecting surface does in fact reflect some energy and, because of the wedge shape of the mirror, this energy is directed away from the laser beam path. The intensity of this off-path reflection is measured to determine the laser output power.

5 Claims, 2 Drawing Sheets

LASER OUTPUT POWER MEASURING METHOD AND APPARATUS

FIELD OF INVENTION

This invention relates to the field of laser technology and more particularly to measuring the power of a laser.

BACKGROUND OF INVENTION

The power of a laser is often measured on line by sampling the laser beam during the operation of the laser and calculating the power of the transmitted, or usable, beam based on the power in the sample. One method of sampling the beam on line is to place a beamsplitter in the path of the beam after the beam has exited the laser cavity, that is, beyond the front mirror, and "split off" a portion of the beam for sampling. The power in the split-off portion of the beam is measured using any of a number of optical measuring devices, and the power of the transmitted beam is then calculated. Sampling the laser beam with a beamsplitter has at least two disadvantages—the usable power of the laser beam is reduced by the power which is split off, and the spatial profile of the transmitted beam may be distorted by the beamsplitter.

Another method of sampling a laser beam on line is to use a rear mirror which is designed to permit a small amount of the beam to "leak" through the mirror. The leaked power is then measured and the power of the transmitted beam is calculated. This method of sampling the laser beam on line has the same disadvantage of reducing the usable power of the laser, and a further disadvantage of inaccuracy because it samples the beam at the rear mirror, before the beam has been fully amplified in the laser cavity, rather than sampling the beam as it exits the laser cavity through the front mirror. In addition, slight changes in reflectivity of the rear mirror may introduce large errors in the measured power.

SUMMARY OF THE INVENTION

The invention measures, as the beam sample, a portion of the laser beam that is reflected out of the laser beam path by a wedge shaped front mirror, that is, an optical wedge. The front mirror has a partially reflective coating which permits the output of the laser to pass through the mirror while reflecting part of the impinging beam back through the laser cavity to provide the regenerative action on which laser operation depends. The front mirror has two surfaces, one of which carries the partially reflective coating. The second surface, which is either uncoated or coated with a non-reflective coating and thus is nominally non-reflecting, does in fact reflect some energy. To prevent this reflected energy from interfering with the portion of the laser beam reflected from the partially reflective coating, the two surfaces of the mirror are made non-parallel, thereby forming an optical wedge. The partially reflective surface is perpendicular to the laser beam path and the nominally non-reflective surface is at an angle to the beam path. This causes reflections from the second, or non-reflective, surface to be directed off axis, away from the laser beam path. This reflected power is usually lost; however, the invention uses it as a measure of the power of the transmitted beam. Thus depletion of the laser output power specifically for power measurement is avoided.

Assume, for example, the first surface of the front mirror is the partially reflective surface, that is, the surface perpendicular to the laser beam, and the second surface is the "non-reflective", or angled, surface. The energy unavoidably reflected by the second surface is reflected, off axis, back toward the first surface in a beam $A_{1i}$. The first surface then transmits a portion of this reflected energy as a beam, $A_{1o}$, and re-reflects a portion as a beam $B_{1i}$ toward the second surface. The second surface transmits a portion of this re-reflected energy as a beam, $B_{1o}$, and again reflects a portion $A_{2i}$ toward the first surface. Thus there is a series of off-axis partial internal reflections and partial transmissions which produce a series of off-axis beams.

The off-axis, rearward transmitted power $P_{ANo}$ in the Nth beam $A_{No}$ is related to the output power, $P_o$, of the laser by the formula:

$$P_{ANo} = P_o(1-R_1)R_2(R_1R_2)^{N-1}/(1-R_2)$$

where $R_1$ is the reflectivity of the first surface of the mirror, and $R_2$ is the reflectivity of the second surface of the mirror.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Figure 1A:
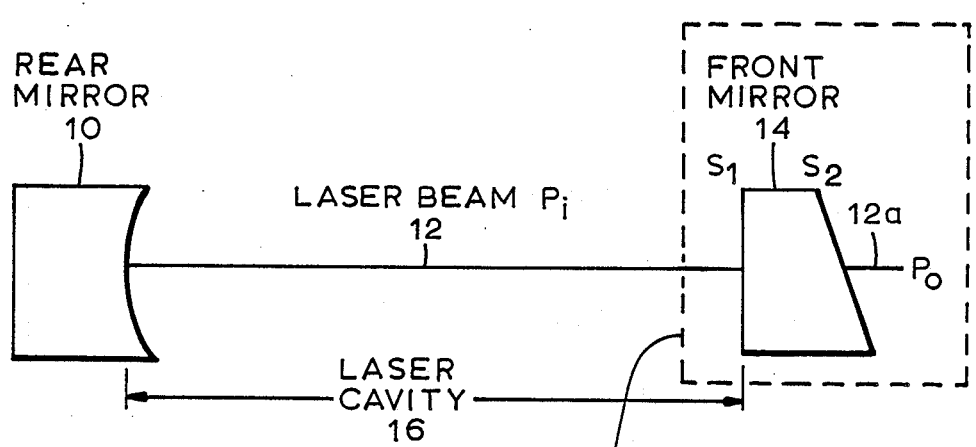
FIGS. 1a and 1b are diagrams of a laser unit constructed in accordance with a first embodiment in which the front mirror has a front partially reflective surface and a rear non-reflective surface.
Figure 1B:
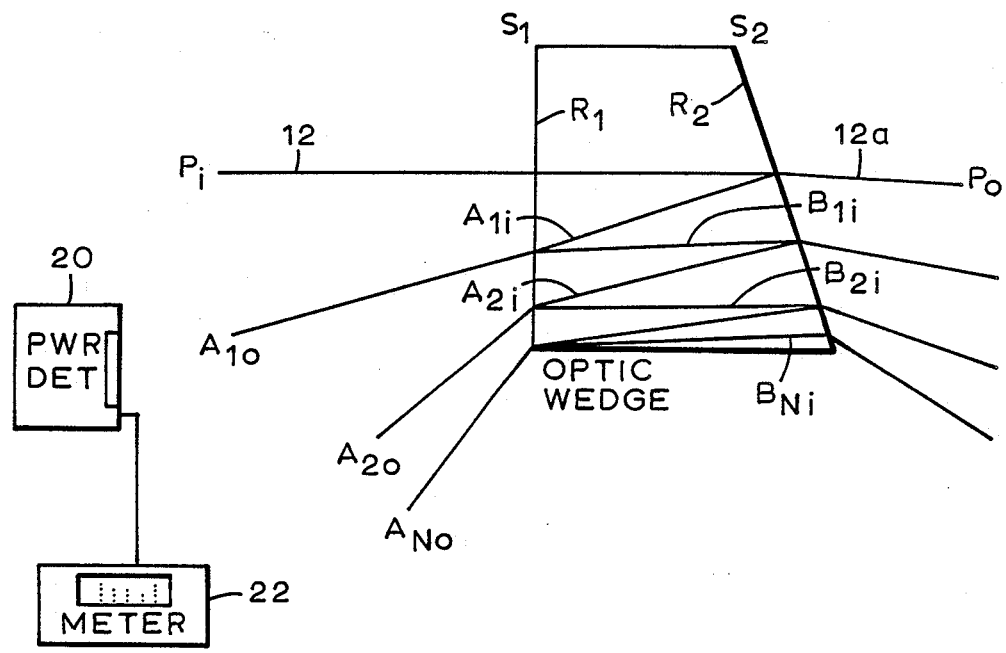
Figure 2A:
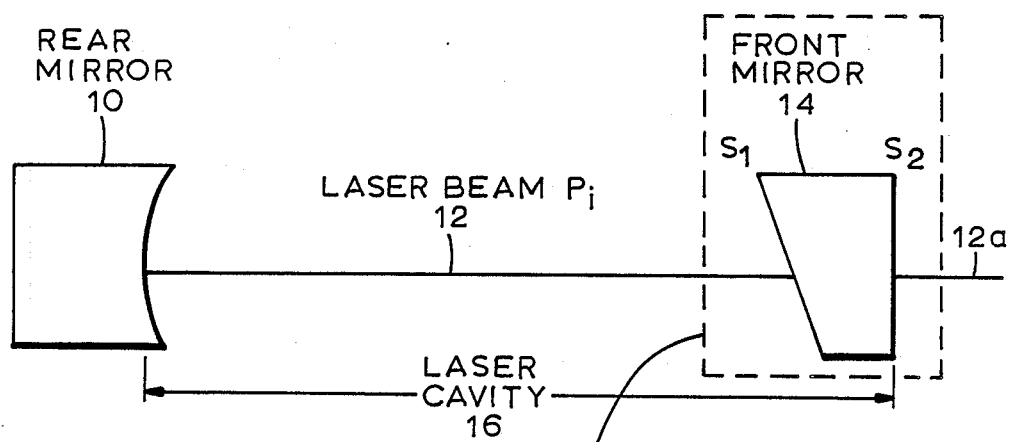
FIGS. 2a and 2b are diagrams of a laser unit constructed in accordance with a second embodiment in which the front mirror has a front non-reflective surface and a rear partially reflective surface.
Figure 2B:
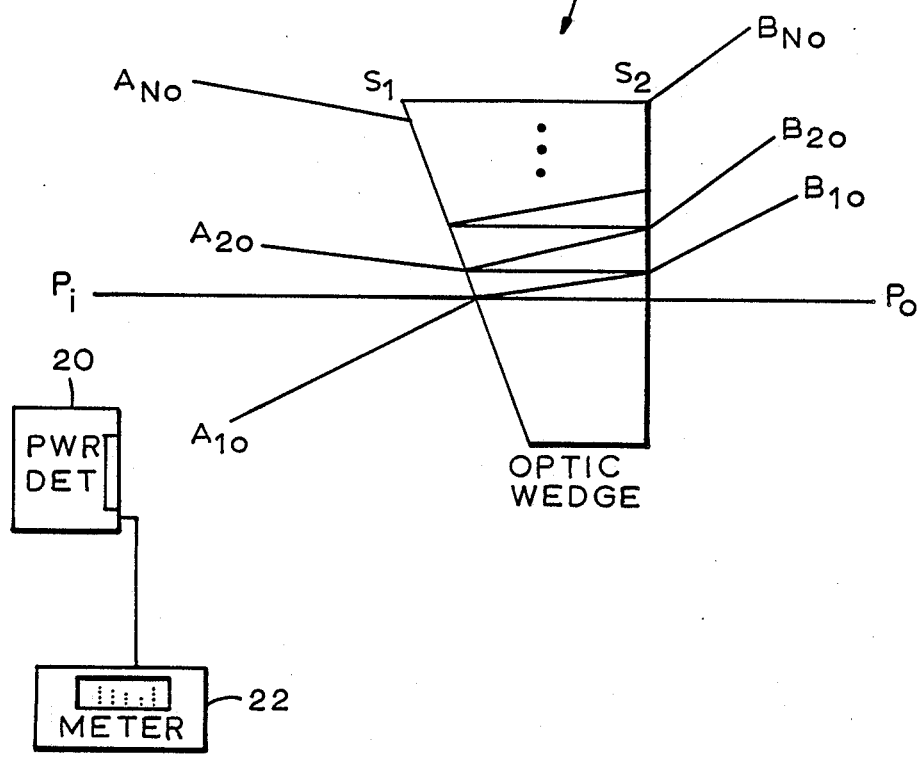

A laser incorporating the invention having a laser cavity 16, a partially reflective front mirror 14 and a fully reflective rear mirror 10, is shown in FIGS. 1 and 2. A laser beam 12 is repeatedly reflected back and forth through the cavity 16, while a portion 12a of the beam 12 exits the laser cavity 16 through the front mirror 14.

With reference to FIG. 1, before exiting the laser, the beam 12 passes in turn through a front, or first, partially reflective surface, $S_1$, of the front mirror 14, and then a non-reflective, or second surface, $S_2$. The $S_2$ surface of the mirror 14 typically has an anti-reflective coating to allow the exiting laser beam 12a to pass through this surface with minimum reflection. However, the $S_2$ surface unavoidably reflects some portion of the beam 12, and the front mirror is therefore designed as an optical wedge, with a second surface non-parallel to the first surface, and thus energy reflected from the surface $S_2$ is directed away from the laser beam 12. Although this reflected portion of the beam is lost from the laser output power, $P_o$, the total laser output power and beam uniformity are optimized by thus avoiding any interference between the beam $A_{No}$ reflected by the second surface, $S_2$, and the portion of the beam 12 reflected by the first surface, $S_1$.

Referring still to FIG. 1, the energy reflected by the second surface, $S_2$, of the front mirror 14, denoted, for example, by beam $A_{1i}$, is reflected off-axis toward the first surface, $S_1$. The first surface, $S_1$, then transmits a portion of the reflected energy as a beam $A_{1o}$ and rereflects a portion of the energy as a beam $B_{1i}$. The internally reflected beam $B_{1i}$ is again transmitted in part as a beam $B_{1o}$ and reflected in part as a beam $A_{2i}$. Thus there is a series of off-axis internal reflections, with associated off-axis transmissions of beams $A_{No}$ and $B_{No}$.

A power detector 20, which can be any optical power measuring device, and an associated meter 22 are positioned to measure the power of at least one of the off-axis transmitted beams. In the first embodiment, the power of either beam $A_{1o}$ or $B_{1o}$ is measured since these beams have much greater intensity than any of the other transmitted beams, $A_{2o} \ldots A_{No}$ or $B_{2o} \ldots B_{No}$. The choice between using beam $A_{1o}$ or beam $B_{1o}$ depends on the relectivities of surfaces $S_1$ and $S_2$ and on other factors such as the mechanical construction of the laser cavity 16. The measured power $P_{A1o}$ of beam $A_{1o}$ is related to the internal power $P_i$, of the laser at surface $S_1$, by the formula:

$$P_{A1o} = P_i(1-R_1)^2 R_2 \qquad (A)$$

where $R_1$ and $R_2$ are the reflectivities of the first and second surfaces of the front mirror, respectively.

More generally, the measured power of the off-axis transmitted beams is related to the internal power at $S_1$, $P_i$, of the laser by the following formulas:

$$P_{ANo} = P_i(1-R_1)^2 R_2 (R_1 R_2)^{N-1} \qquad (1)$$

$$P_{BNo} = P_i(1-R_1)(1-R_2)(R_1 R_2)^N \qquad (2)$$

The power, $P_o$, in the output beam 12a is related to the internal power at $S_1$, $P_i$, by the formula:

$$P_o = P_i(1-R_1)(1-R_2) \qquad (3)$$

Substituting formula (3) into (1) and (2), the measured power, is proportional to the output power, $P_o$, according to the formulas:

$$P_{ANo} = P_o(1-R_1)R_2(R_1 R_2)^{N-1}/(1-R_2) = K_1 P_o \qquad (1)$$

$$P_{BNo} = P_o(R_1 R_2)^N = K_2 P_o \qquad (2)$$

In practice, $P_o$ and $P_{ANo}$ or $P_{BNo}$ are first measured by conventional means to calculate a proportionality constant $K_1$ or $K_2$. Thereafter, throughout the operation of the laser, the output power $P_o$ is calculated by measuring $P_{ANo}$ or $P_{BNo}$ and dividing by the proportionality constant. Thus the reflectivities $R_1$ and $R_2$ need not be known to calculate the output power $P_o$.

Thus, the apparatus uses a portion of the output power that would otherwise be wasted as a measure of the power of the transmitted beam 12a. In this way, the power of the laser is not attenuated, for example, by a beamsplitter or a leaking rear mirror, in order to measure the power of the beam.

Referring to FIG. 2, another embodiment of the invention uses a front mirror 14 with a non-reflective first surface, $S_1$, and a partially reflective second surface, $S_2$. The $S_1$ surface reflects a portion of the beam, $A_{1o}$, away from the laser beam path 12 to avoid interference between this unavoidably reflected beam and the beam 12 intentionally reflected by the $S_2$ surface. The reflected beam, $A_{1o}$, is reflected only by the first mirror surface, $S_1$. Thus the power of this reflected beam is directly related to the internal power, $P_i$, of the laser and the reflectivity of the first surface, $R_1$ by the formula:

$$P_{A1o} = P_i R_1 \qquad (4)$$

Substituting formula (3) for $P_i$, (4) becomes:

$$P_{A1o} = P_o R_1/(1-R_1)(1-R_2)$$

and again the power $P_o$ of the exiting laser beam can be simply calculated. Similarly, the power $P_o$ can be calculated using $P_{B1o}$ by the formula:

$$P_{B1o} = P_i(1-R_1)(1-R_2)(R_1 R_2) \qquad (5)$$

Substituting formula (5) for $P_i$, (4) becomes $$P_{B1O} = P_o R_1 R_2$$

The invention has several advantages over previous methods of beam measurement. First, the invention does not attenuate the laser beam in order to measure the power of the beam. Instead, the reflected power of the beam that would otherwise be wasted is used for power measurement. Also, the invention, which samples a portion of the beam that is reflected out of the beam path by the front mirror, does not require additional optical hardware, for example, a beamsplitter.

Additionally, the invention accurately calculates the power of the exiting beam by measuring the power of a portion of the beam which is directly related to the power of the transmitted beam, unlike the "leaky" mirror measurement method which uses a beam reflected from the rear mirror, that is, a beam which may not have a linear relationship to the beam transmitted through the front mirror, to calculate the transmitted power, $P_o$. In addition, the invention avoids the potential inaccuracy of the leaky mirror technique caused by small changes in cavity reflectivity. Thus the invention is a more efficient and accurate method of measuring the output power of a laser beam than the prior art.

The foregoing description has been limited to two specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A laser unit comprising:
   A. a laser cavity for internally directing a laser beam along a beam path;
   B. a rear mirror for reflecting the laser beam into said laser cavity along the beam path;
   C. a front mirror including:
      1. a first surface for reflecting a first portion of the laser beam into said laser cavity along the beam path and transmitting a second portion of the laser beam, and
      2. a second surface which is at an angle to said first surface whereby any portion of the beam reflected by the second surface is directed away from the beam path,
   the output of said laser unit being a portion of said laser beam that is transmitted by both surfaces;
   D. measuring means responsive to the power in at least a portion of said beam portion reflected by said second surface.

2. The laser unit of claim 1, wherein said measuring means includes means for calculating the output power of the laser unit from the reflected beam power to which said measuring means responds.

3. The laser unit of claim 2, wherein:
   a. said second surface is a rear surface,
   b. the reflected beam to which the measuring means responds is reflected by said second surface, and
   c. said calculation means calculates the output power, $P_o$, according to the formula $$P_{ANo} = P_o(1-R_1)R_2(R_1R_2)^{N-1}/(1-R_2)$$

where $P_{ANo}$ is the measured power of the reflected beam, $R_1$ and $R_2$ are the reflectivities of the first and second surfaces respectively, N is the number of times the beam has been reflected between the two surfaces of said front mirror, and $P_i$ is the internal power of the laser.

4. The laser unit of claim 2, wherein:
   a. said second surface is a rear surface,
   b. the reflected beam to which the measuring means responds is reflected by said first surface, and
   c. said calculation means calculates the output power, $P_o$, according to the formula $$P_{BNo} = P_o(R_1R_2)^N$$

where $PB_{No}$ is the measured power of the reflected beam, $R_1$ and $R_2$ are the reflectivities of the first and second surfaces respectively, N is the number of times the beam has been reflected between the two surfaces of said front mirror, and $P_i$ is the internal power of the laser unit.

5. The laser unit of claim 2, wherein:
   a. said second surface is a front surface,
   b. the reflected beam to which the measuring means responds is reflected only by said second surface, and
   c. said calculation means calculates the output power, $P_o$, according to the formula $$P_{A1o} = P_o R_1/(1-R_1)(1-R_2)$$

where $PA_{1o}$ is the measured power of the reflected beam, $R_1$ and $R_2$ are the reflectivities of the first and second surfaces respectively, N is the number of times the beam has been reflected between the two surfaces of said front mirror, and $P_i$ is the internal power of the laser unit.

* * * * *